ium Patent [19] [11] Patent Number: 5,580,614
Amberg-Schwab et al. [45] Date of Patent: Dec. 3, 1996

[54] PROCESS AND COATING COMPOUND FOR PRODUCING UV OR UV/IR OR IR/UV HARDENED COATINGS

[75] Inventors: Sabine Amberg-Schwab, Würzburg; Walther Glaubitt, Veitshöchheim; Klaus Greiwe, Würzburg, all of Germany; Ertugrul Arpac, Antalya, Turkey

[73] Assignee: Fraunhofer-Gesellschaft Zur Forderung Der Angewandten Forschung E.V., Germany

[21] Appl. No.: 524,472

[22] Filed: Sep. 7, 1995

Related U.S. Application Data

[63] Continuation of Ser. No. 269,630, Jul. 1, 1994, abandoned, which is a continuation of Ser. No. 910,416, Jul. 8, 1992, abandoned.

[30] Foreign Application Priority Data

Jul. 10, 1991 [DE] Germany .................. 41 22 743.3

[51] Int. Cl.$^6$ ...................................... B05D 3/06
[52] U.S. Cl. .................. 427/493; 427/515; 427/519; 427/521; 427/387
[58] Field of Search .......................... 427/387, 515, 427/508, 493, 521

[56] References Cited

U.S. PATENT DOCUMENTS

| | | | |
|---|---|---|---|
| 3,919,438 | 11/1975 | Urkevich | 427/515 |
| 4,042,749 | 8/1977 | Sandvig | 427/515 |
| 4,084,021 | 4/1978 | Sandvig | 427/515 |
| 4,544,572 | 10/1985 | Sandvig et al. | 427/503 |
| 4,735,829 | 4/1988 | Hirose et al. | 427/387 |
| 4,758,448 | 7/1988 | Sandvig et al. | 427/515 |
| 4,956,221 | 9/1990 | Gutek | 427/515 |

FOREIGN PATENT DOCUMENTS

| | | | |
|---|---|---|---|
| 365027 | 4/1990 | European Pat. Off. . | |
| 450625 | 10/1991 | European Pat. Off. | 427/515 |

OTHER PUBLICATIONS

Amberg–Schwab, "Protective Coatings for Organic Polymers by Sol–Gel Techniques", Materials Science Monographs, vol. 67 (High Performance Ceramic Films and Coatings), pp. 203–210, Jun. 25, 1991.

Primary Examiner—Shrive Beck
Assistant Examiner—Erma Cameron
Attorney, Agent, or Firm—Marshall & Melhorn

[57] ABSTRACT

A process for producing UV or UV/IR or IR/UV-hardened coatings on substrates by applying a coating compound to the substrate to be coated and by the action of UV radiation, or combined UV/IR or IR/UV radiation, as well as UV or UV/IR or IR/UV-hardenable coating compounds comprising a component A, which is a solution of a complexed, metal organic Ti or Zr compound with polymerizable ligands, a component B, which is a hydrolyzate of one or more radically polymerizable alkoxy silanes of general formula

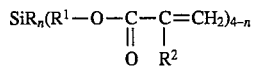

and 0.1 to 5% by weight of a component C, which is an initiator for the polymerization.

20 Claims, No Drawings

PROCESS AND COATING COMPOUND FOR PRODUCING UV OR UV/IR OR IR/UV HARDENED COATINGS

This application is a continuation of application Ser. No. 08/269,630, filed Jul. 1, 1994, now abandoned which is a continuation of application Ser. No. 07/910,416, filed Jul. 8, 1992 now abandoned.

The invention relates to a process for producing UV or UV/IR or IR/UV hardened coatings on substrates by applying a coating compound to the substrate to be coated and by the action of UV radiation, or combined UV/IR or combined IR/UV radiation on the coated substrate, as well as UV or UV/IR or IR/UV hardenable coating compounds for use in this process.

Numerous articles and in particular plastic articles must be provided with scratch-proof coatings, because otherwise their scratch sensitivity would not be such as to permit practical use or would only permit short periods of use. Although over the last few years numerous scratch-proof coating materials have been developed, there is still room for improvement, particularly with respect to the scratch resistance, abrasion resistance and adhesion to the substrate, together with optical transparency for a suitable coating thickness. Another characteristic of known coating materials requiring improvement is the curing time thereof. Curing generally takes place thermally and/or by irradiation and in most cases thermal or photochemical hardening catalysts are added. Finally, transparent plastic parts are being increasingly used in areas previously reserved for inorganic glasses. The use of said plastic parts in such areas presupposes that the soft plastic surface can be effectively finished without significantly repairing the transparency of the plastic parts.

Thermally curable coating materials for plastic surfaces having a polysiloxane base, which lead to improved mechanical characteristics such as abrasion and scratch resistance are already commercially used. However, the use of these coating materials is limited by the limited thermal stability of the organic polymer materials. Therefore for less thermally stressed, thermoplastics, such as e.g. PMMA, ABS, PS, PVC, PUR, PE, etc., UV hardenable coating materials are particularly suitable as a result of their faster curing and their lower thermal stressing.

Scratch-proof materials, particularly scratch-proof coatings, based on inorganic-organic polymers or organically modified silicates have been known for several years and in certain cases are already produced on an industrial scale. Compared with purely organic coating systems siloxane-containing paint formulations prepared by reacting hydrolyzable silicon compounds with water or dehydrating agents, have a much better abrasion behavior and a greater scratch resistance.

DE 39 17 535 A1 and EP 171 493 A2 describe processes for producing scratch-proof coatings, in which a paint obtained by the hydrolytic precondensation of a titanium or zirconium compound and an organofunctional silane, as well as optionally a difficultly volatile oxide of an element of the main groups Ia to Va or auxiliary groups IVb or Vb of the periodic system or a compound forming such an oxide under the reaction conditions, is applied to a substrate and hardened. A description of thermally hardenable coating materials, for whose production it is necessary to use a complicated, multistage hydrolysis process, in that more water is added than is required for the hydrolysis of all the alkoxy groups.

U.S. Pat. No. 4,754,012 describes multicomponent sol-gel protective coating systems, in which or functional alkoxysilanes are processed together with metal alkoxides to a scratch-proof coating material. However, following the application of the coating materials to the polycarbonate disks, the specimens undergo thermal curing (2 hours at 130° C.).

U.S. Pat. No. 4,753,827 also describes multicomponent sol-gel protective coating systems, in which organofunctional alkoxy silanes are processed together with metal alkoxides to a scratch-proof coating material. However, following the application of the coating materials to the polycarbonate disks, the specimens undergo thermal hardening (2 to 3 hours at 130° C.). In addition, said coating tests are carried out with polycarbonate disks, which are provided with a printer prior to the application of the paint.

It is a disadvantage of all these coating materials based on hydrolyzable, organically modified silanes that they cannot be hardened or can only be inadequately hardened by UV-radiation are that in certain cases it is also necessary to use a primer.

EP 383 074 A2 describes a radiation-hardenable coating material, which leads to transparent, abrasion-resistant and dyeable coatings. The scratch resistance of the coating is adjusted by adding colloidal $SiO_2$. The previously prepared, colloidal $SiO_2$ is dispersed in the coating solution as a filler for the purpose of increasing the scratch resistance and is not, as is conventional in a sol-gel process, formed in situ by hydrolysis of the corresponding starting compounds during the preparation of the coating solution and bound into the polysiloxane network on a molecular plane. Problems arise in uniformly distributing the $SiO_2$ in the presence of organic compounds in the coating solution, so as to obtain a uniform wetting of the filler with the organic compounds. This leads to problems in connection with the wetting of the substrate and therefore to fluctuations in the optical quality of the cured coating.

Canadian patent 1 207 932 describes a radiation-hardenable coating material, which leads to abrasion-resistant, transparent coatings. For this purpose inter alia use is made of colloidal $SiO_2$, which is made water repellent by hydrolyzable alkoxy silanes. Here again the $SiO_2$ is only suspended in the resulting network and here again there is a risk of a non-uniform distribution and wetting of the colloidal $SiO_2$ in the coating solution with the known optical quality disadvantages.

DE-AS 25 44 860 describes a process for producing abrasion-resistant coatings on plastic or metal substrates. For this purpose a coating compound formed from a mixture of a metal ester (Al, Ti or Zr), an epoxy or an acryloxy silane and optionally conventional additives or fillers is applied to the substrate and is hardened thermally, or by UV radiation or by electron beams. However, this process suffers from the risk that as a result of the hydrolysis of the metal ester the metal will be deposited as an insoluble deposit. Thus, in this way it is not possible to obtain stoichiometrically precisely defined, coatable paints, which lead in the cured state to abrasion-proof coatings.

DE 31 00 675 A1 describes a coated, shaped article made from synthetic resins of the polycarbonate-resin type, as well as a process for the production thereof. To the article is firstly applied a primer, followed by curing and only then is the actual scratch-proof coating applied to the hardened primer. This scratch-proof coating consists of hydrolyzable Si compounds and a hardening catalyst, it also being possible to add titanium compounds. However, the curing of the scratch-proof coating takes place by heating. A further disadvantage of said process is that it is necessary to apply and cure a primer between the substrate and the scratch-proof coating. Moreover, additional process stops are required, which are costly and increase production costs.

In addition, UV radiation-hardenable coating compositions based on acrylates and/or methacrylates are known. Thus, e.g. EP 323 560 A2, U.S. Pat. No. 4,600,649, DE 36 16 176 Al and DE 39 32 460 Al describe abrasion-resistant, UV radiation-hardenable coatings based on acrylates and/or methacrylates. However, the disadvantage of these coating materials is that they have lower abrasion resistances than e.g. siloxane coatings. Moreover, the viscosity of such coating solutions is generally too high to e.g. allow a spin coating on planar substrates.

Therefore a substitution of the hitherto used UV curable paints is desirable, because their scratch resistance and abrasion resistance do not always satisfy all demands.

The problem of the invention is therefore to provide a process with which UV curable coatings can be produced, which have a high scratch resistance, a high abrasion resistance, a high adhesiveness and a high optical transparency. It must also be possible to provide substrates, particularly plastic or metal substrates, with a coating having the aforementioned characteristics, without the substrate to be coated having to be pretreated with a primer. The coatings must in particular have a very good adhesion to shaped or moulded articles made from plastics, such as e.g. polycarbonate. In addition, it must be possible to harden the coatings with such short UV contact times, that the coating process can be integrated without difficulty into existing production processes (in-line production with short cycle times). It must also be possible to subsequently cure thermally prehardened coatings by UV radiation. UV radiation hardening prior to thermal curing must also be possible.

Therefore the problem of the present invention is also to provide UV curable coating materials leading to coatings having the aforementioned characteristics.

It must also be possible to adjust the viscosity of the coating material necessary for the coating of planar substrates in such a way that a spinning or dip-spinning coating is possible. It must in particular be possible to provide data carriers made from polycarbonate (compact disks, etc.), magnetooptical data stores (MOs), video disks, etc. with a transparent, scratch-proof and abrasion-resistant coating, which can be cured by UV radiation with short contact times.

According to the invention this problem is solved in that use is made of a coating compound, which comprises a component A, which is a solution of a complexed, metal organic compound with polymerizable ligands and which can be obtained by reacting, optionally in an inert solvent, a metal organic compound of general formula (I)

$$MR_4 \quad (I)$$

in which the radicals R can be the same or different, M=Ti or Zr and R=Hal, CH, OR' or O—(CH$_2$—CH$_2$O—)$_m$R', with m=1 to 3, Hal=Cl or Br and R'=alkyl, alkenyl, alkynyl or acyl, in each case with 1 to 18 and preferably 1 to 6 and in particularly preferred manner 1 to 4 C-atoms, with one or more singly or multiply ethylenically unsaturated chelating agents, which have at least two oxygen donor atoms and which are used in a quantity of 0.5 to 10 mole, preferably 1 to 2.5 mole, based on 1 mole of MR$_4$ as sequestrants, a component B, which is a hydrolyzate of one or more radically polymerizable alkoxy silanes and which can be obtained by the hydrolysis of one or more radically polymerizable alkoxy silanes of general formula (II)

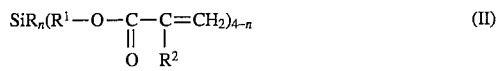

with n=2 or 3, in which the radicals R, R$^1$ and R$^2$ same or different, R has the same meaning as in formula (I), R$^1$ is an alkylene radical with 1 to 8 C-atoms and R$^2$ is a H-atom or a hydrocarbon radical, preferably an alkyl radical, with 1 to 8 C-atoms, in that the hydrolysis, optionally in an inert solvent, is performed with a smaller, but at least half, the water quantity necessary for the complete hydrolysis of all the alkoxy groups, 0.1 to 5% by weight of a component C, which is an initiator for the polymerization, and optionally conventional additives, the quantities of components A and B in the coating compound being selected in such a way that the molar ratio of the hydrolyzable compound (II) to the complexed compound MR$_4$ is between 10:4 and 10:0.1 and is preferably between 10:2.5 and 10:0.5.

It has surprisingly been found that the coating process according to the invention leads to coatings, which are extremely scratch-proof, abrasion-resistant, strongly adhering, transparent and condensate-stable. The coating compounds according to the invention can be hardened by UV radiation alone, or by combined UV/IR radiation. If hardening is performed by UV radiation alone, the inventive coating compounds offer the important advantage that only very short UV pot lifes are necessary. In the case of combined UV/IR radiation, it is possible either firstly to thermally preharden the coating and then completely cure the sane by UV radiation, or firstly preharden by UV radiation, followed by thermal curing. This combined UV/IR hardening is particularly suitable for pigmented coating systems, because pigments frequently absorb UV radiation and consequently an IR hardening of the coating is possible here in the "light shadow" of the pigments.

It has surprisingly been found that through the quantity of the chelating agent in the component A, the hardness and adhesion of the resulting coating is influenced and can be adapted to the requirements of the particular case.

By adding chelating agent to the metal organic compound MR$_4$ the hydrolysis rate of the resulting, complexed metal organic compound is reduced.

Therefore a uniform distribution of the individual components in the resultant matrix is obtained. The addition of the chelating agent to the metal organic compound MR$_4$ or the transfer of the metal organic compound MR$_4$ into a chelate complex prevents the metal from being precipitated as an oxide or hydroxide during hydrolysis leading to inhomogeneous, milky-turbid coatings.

The coating process according to the invention makes it possible to coat substrates made from the most varied materials. Thus, e.g. a plurality of plastics or substrates made from a plurality of organic polymers can be coated, or coating is also possible of metallized plastics or metals. Specific examples and preferred embodiments of organic polymers are polycarbonate (PC), polystyrene (PS), polymethyl methacrylate (PMMA), acrylate-butadiene-styrene (ABS), polyvinyl chloride (PVC), polyurethane (PUR), polyethylene (PE) or polyethylene terephthalate (PET). Specific examples for metallized plastics or metals are aluminized PC, aluminized PMMA, metallized (sputtered) polyester sheets or aluminum.

It is possible with the coating process according to the invention to even provide plastics with a readily adhering, scratch-proof coating without the use of a primer or the like which, according to prevailing opinion, due to inadequate adhesion could only be coated with difficulty with scratch-proof protective coatings. Such plastics are e.g. polystyrene (PS), polymethyl methacrylate (PMMA) and polycarbonate (PC). According to the prior art said plastics had to be provided with a primer prior to coating.

A further advantage of the coating compounds according to the invention is that there is no need to pretreat the substrates to be coated prior to coating taking place. This obviates the need for pretreatments, such as e.g. defatting, corona treatment or cleaning baths. It is assigned that the inventive coating compound takes over the cleaning of the substrate, i.e. has solvent characteristics and as a result there is no need to pretreat or clean the substrates.

The coating compound according to the invention is a two-component paint, whereof one main component consists of a complexed, metal organic compound with polymerizable ligands and whereof the second main component is a hydrolyzate of a radically polymerizable alkoxy silane. Further components of the inventive coating compound are initiators for the polymerization and optionally further conventional additives, such as e.g. fillers or pigments. When kept separately components A and B are stable in storage, provided that they are not exposed to excessive temperatures or UV radiation. It is also necessary for the storage stability of component A, that water has no access thereto, because otherwise there would be a premature hydrolysis of the complexed, metal organic compound.

When components A and B are brought together and well mixed, the residual water content in component B leads to a hydrolysis and condensation of the complexed, metal organic compound and under these conditions the chelate ligand does not split off. The final hardening then takes place by the polymerization of the monomerically used, polymerizable ligands and components. The activation energy necessary for polymerization can be supplied in the form of UV radiation and/or in the form of IR radiation (heat). It may be necessary, prior to the actual hardening by UV radiation, to thermally dry the coating, in order to remove the alcohols released by hydrolysis or condensation. A thermal predrying also leads to improved flow characteristics of the coating applied.

The complexed, metal organic compounds are titanium or zirconium compounds. The choice of the corresponding metal is a function of the requirements of the particular case. The inventive titanium paints are harder than identical zirconium paints, whereas zirconium paints have a higher stability with respect to UV radiation than the identical titanium paints.

The metal organic titanium or zirconium compounds containing the complexed, polymerizable ligands can be obtained in that titanium or zirconium compounds of general formula $MR_4$ (M=Ti, Zr) are reacted with multiply ethylenically unsaturated chelating agents having at least two oxygen donor atoms and are consequently converted into a chelate complex. The ligands R of the metal are hydrolyzable and have the aforementioned meaning and for R=OH the hydrolysis has virtually already taken place. If the ligands R contain hydrocarbon radicals, they can either be branched, unbranched or cyclic. Preferably use is made of hydrocarbon radicals with 1 to 4 carbon atoms, but those with 1 to 18 carbon atoms can also be used. If the ligands R contain hydrocarbon radicals with a high number of carbon atoms, the alcohol split off during hydrolysis acts as an internal fica-control agent, which has an advantageous influence on the flow characteristics of the coating compound according to the invention.

The hydrocarbon radicals R' in the ligands R can be alkyl, alkenyl, alkinyl or acyl radicals. The alkyl radicals are e.g. straight or branched-chain or cyclic radicals with 1 to 18 carbon atoms and in particular lower alkyl radicals with 1 to 6, preferably 1 to 4 carbon atoms. Specific examples of alkyl radicals are methyl, ethyl, n-propyl, i-propyl, n-butyl, s-butyl, t-butyl, i-butyl, n-pentyl, n-hexyl and cyclohexyl.

The alkenyl radicals are e.g. straight or branched-chain or cyclic radicals with 1 to 18 carbon atoms and in particular lower alkenyl radicals such as e.g. vinyl, allyl or 2-butenyl.

Specific examples for zirconium compounds $ZrR_4$ are $ZrC_{14}$, $Zr(O-i-C_3H_7)_4$, $Zr(OC_4H_9)_4$, $Zr(acetylacetonato)_4$, specific examples for titanium compounds $TiR_4$ are $TiCl_4$, $Ti(OC_2H_5)_4$, $Ti(OC_3H_7)_4$, $Ti(O-i-C_3H_7)_4$, $Ti(OC_4H_9)_4$, $Ti(acetylacetonato)_2$ $(O-i-C_3H_7)_2$, $T(2-ethylhexoxy)_4$.

On converting the metal organic compound $MR_4$ by means of a chelating agent into a chelate complex, as a function of the added chelating agent quantity, the chelate ligands occupy additional coordination points of the central atom and/or ligands R are displaced. According to the invention use is made of chelating agents, which are singly or multiply ethylenically unsaturated and which have at least two oxygen donor atoms. Preferably use is made of singly or multiply ethylenically unsaturated β-diketones, carboxylic acids and glycols. Particular preference is given to the use of acrylic or methacrylic acid derivatives as chelating agents. Specific examples of chelating agents are acrylic acid, methyacrylic acid and allyl acetoacetates.

The chelating agents are used in a quantity of 0.5 to 10 and preferably 1 to 2.5 mole, based on 1 mole of $MR_4$. The reaction can take place in an inert solvent, but also without a solvent. It is possible to adjust the viscosity of the resultant component A by adding an inert solvent, so as to meet the requirements of the particular case.

It is also possible by the choke and/or the quantity of the added chelating agent, to influence the characteristics of the resulting coating and adapt to the particular requirements of the case.

The second main component of the two-component paint, i.e. component B, is a hydrolyzate of a radically polymerizable alkoxy silane of general formula (II). This hydrolyzate is obtained by reacting with water the alkoxy silane of formula (II). The necessary water quantity is at least half as great as that theoretically necessary for the complete hydrolysis of all the hydrolyzable groups, but is smaller than the theoretically necessary quantity. If e.g. the hydrolyzable alkoxy silane is constituted by 3-methacryloxypropyl trimethoxy silane (MEMO), then the preferred water quantity for the hydrolysis is 1.9 mole/mole of MEMO.

The hydrolysis can take place as a function of the consistency of the starting compounds and the viscosity necessary for coating without solvents, or in an inert solvent. It is not necessary to add a solvent because during hydrolysis solvents are produced in the form of the split off compounds NDH. By adding an inert solvent the viscosity of component B can be adjusted to the values necessary for the particular case.

It has surprisingly been found that under the conditions of the inventive process the hydrolyzate of the alkoxy silane (II) is stable during storage.

Specific examples for polymerizable and hydrolyzable alkoxy silanes of general formula (II) are 3-methacryloxypropyl trimethoxysilane (MEMO), 3-acryloxypropyl trimethoxy silane, 2-methacryloxy ethyl trimethoxy silane, 2-acryloxyethyl trimethoxy silane, 3-methacryloxypropyl triethoxy silane, 3-acryloxypropyl triethoxy silane, 2-methacryloxyethyl triethoxy silane, 2-acryloxyethyl triethoxy silane, 3-methacryloxypropyl-tris (methoxyethoxy) silane, 3-methacryloxypropyl-tris (butoxyethoxy) -silane, 3-methacryloxypropyltris(propoxy) -silane, 3-methacryloxypropyl-tris(butoxy) -silane, 3-acryloxy-propyl-tris (methoxyethoxy) -silane, 3-acryloxypropyl-tris (butoxyethoxy)- silane, 3-acryloxypropyl-tris(propoxy) -silane and 3-acryloxypropyl-tris butoxy)-silane.

If component A contains as polymerizable chelate ligands acrylic acid, methacrylic acid or some other suitable carboxylic acid, then on bringing together the two components A and B, an esterification takes place between said carboxylic acid and the alcohol RDH resulting from the hydrolysis of the silane (II), accompanied by the release of water, which can then also bring about the hydrolysis of the complexed, metal organic compound (I).

The quantity ratio of the two main components A and B in the inventive coating compound is to be selected in such a way that the molar ratio of compound (II) to compound (I) is between 10:4 and 10:0.1 and in preferred embodiments of the inventive process said ratio is between 10:2.5 and 10:0.5.

In further embodiments of the inventive process multiply functional acrylates and/or methacrylates are added as paint additives to components A and/or B of the inventive coating composition. The adhesion of the resulting coating to organic polymers is increased as a result of this and particularly good adhering coatings are obtained, even to those plastics which, experience has shown, are difficult to coat with scratch-proof protective coatings such as e.g. polystyrene, polymethyl methacrylate or polycarbonate.

The use of multiply functional acrylates and/or methacrylates as paint additives offers the further advantage that as a result a fine-meshed network with high surface hardness is produced in the resulting coating. This makes it possible to absorb the softness of the resulting coating caused by a high organic proportion. It is also possible for the functional acrylates and/or methacrylates to act as solubilizers for hydrophobic impurities of the substrate and consequently lead to an improvement of adhesion.

It is possible to incorporate the polyfunctional acrylates and/or methacrylates into the matrix of the resulting coating in that they are added e.g. to component B, i.e. the hydrolyzate of the polymerizable alkoxy silane (II). If the polyfunctional acrylates and/or methacrylates are e.g. added to the hydrolyzate B, this can take place in a quantity of up to 0.5 mole, preferably 0.01 to 0.2 mole, based on 1 mole of compound (II).

The higher the number of acrylate or methacrylate groups within the molecule, the higher the viscosity of the coating compound. As a function of the particular case, this can lead to problems in connection with application, e.g. as as result of the non-uniform flow of the coating compound the resulting coating thickness varies excessively for the corresponding case. Thus, preference is given to polyfunctional acrylates and/or methacrylates with up to 5 acrylate or methacrylate groups and particularly those with 2 to 5 functional groups.

Specific examples for polyfunctional acrylates and methacrylates are tetraethylene glycol diacrylate (TTEGDA), triethylene glycol diacrylate (TIBGDA), polyethylene glycol-400-diacrylate (PEG400DA), 2-2-bis( 4-acryloxy ethyoxyphenyl)-propane, ethylene glycol dimethacrylate (EGEMA), diethylene glycol dimethacrylate (DEGDMA), triethylene glycol dimethacrylate (TRGDMA), tetraethylene glycol dimethacrylate (TEGEMA), 1,3-butane diol dimethacrylate (1,3BDDMA), 1,4-butane diol dimethacrylate (1,4BDDMA), 1,6-hexane diol dimethacrylate (1,6HDDMA), 1,12-dodecane diol dimethacrylate (1,12DDDMA), noepentyl glycol dimethacrylate (NPGEMA), trimethylol propane trimethacrylate (TMPTMA) and 1,6-hexane diol diacrylate (1,6HDDA).

Preferred examples for polyfunctional acrylates and methacrylates are ditrimethylol propane tetraacrylate (DTMP tetraacrylate), dipentaerythritol pentaacrylate, pentaerythritol triacrylate (PETIA),-polyethylene glycol400-dimethacrylate (PEG400DMA), bisphenol A-dimethacrylate (BADMA), diurethane dimethacrylate (HEMATMDI) and trimethylol propane triacrylate (TMPTA).

As a further component the coating compound according to the invention contains 0.1 to 5% by weight of a polymerization initiator. If the inventive coating compound is hardened-by UV radiation, photoinitiators are added thereto. The inventively used photoinitiators are aryl ketones, such as e.g. acetophenone or benzophenone or substituted acetophones, such as e.g. 1,1,1-trichloroacetophenone or diethoxyacetophenone, particularly hydroxy-substituted acetophenones. It is also possible to use substituted cyclohexyl phenyl ketones. Examples are Irgacure™ 184 (1-hydroxycyclohexyl phenyl ketone), Irgacure™ 500 (1-hydroxycyclohexyl phenyl ketone, benzophenone) and Irgacure™ 907 (2-methyl-1- [4-(methylthio) -phenyl]-2-morpholino-propan-1 -one) of Ciba-Geigy, Darocure 1173 (2-hydroxy-2-methyl-1-phenyl-propan-1-one) and Darocure 1116 (1-(4-isopropylphenyl)-2-hydroxy-2-methyl-propan-1-one) of Merck. It is also possible to use 2-chlorothioxanthone, 2-methylthixanthone, 2-isopropylthioxanthone, benzoin, 4,4'-dimethoxy benzoin, benzoin ethyl ether, benzoin isopropyl ether, benzyl dimethyl ketal and dibenzosuberone.

Thermal initiators can in particular be constituted by organic peroxides in the form of diacyl peroxides (e.g. acetyl-cyclohexane-sulphonyl peroxide, his-(2,4-dichlorobenzoyl) -peroxide, diisononanoyl peroxide, dioctanoyl peroxide, diacetyl peroxide or dibenzoyl peroxide), peroxydicarbonates (e.g. diisopropyl peroxydicarbonate, di-n-butyl peroxydicarbonate, di-2-ethyl hexyl peroxydicarbonate or dicyclohexyl peroxydicarbonate), alkyl peresters (e.g. cumyl-perneodecanoate, t-butyl-perneodecanoate, t-emylperpivalate, t-butyl-per-2-ethylhexanoate, t-butyl-perisobutyrate or t-butyl perbenzoate), dialkyl peroxide (e.g. dicumyl peroxide, t-butyl cumyl peroxide, 2,5-dimethyl hexane-2,5-di-t-butyl peroxide, di(t-butylperoxy-isopropyl)-benzene, di-t-butyl peroxide or 2,5-dimethyl hexine-3-2,5-di-t-butyl peroxide), perketals, (e.g. 1,1-bis (t -butylperoxy) -3,3,5-trimethyl cyclohexane, 1,1-bis (t-butylperoxy)-cyclohexane or 2,2-bis (t-butylperoxy) -butane), ketone peroxides (e.g. cyclohexanone peroxide, methyl isobutyl ketone peroxide, methyl ethyl ketone peroxide or acetyl acetone peroxide) and alkyl hydroperoxides (e.g. pinane hydroperoxide, cumene hydroperoxide, 2,5-dimethyl hexane-2,5-dihydroperoxide or t-butylhydroperoxide), azo compounds (e.g. azobisisobutyronitrile) or pure hydrocarbons (e.g. 2,3-dimethyl-2,3-diphenyl butane or 3,4-dimethyl-3,4-diphenyl butane).

It is optionally possible to add to the coating compound according to the invention conventional paint additives, such as e.g. organic thinners, flow-control agents, coloring agents (dyes or pigments), UV stabilizers, fillers, viscosity regulators or oxidation inhibitors.

Conventional coating processes are used for coating purposes such as e.g. dipping, flow coating, pouring, spinning, spraying or spreading. The coating is applied to the substrate in thicknesses of e.g. 0.1 to 25 μm, preferably 1 to 20 μm and in particular 3 to 15 μm. It is also possible, but not necessary, to prime the substrate, prior to the application of the inventive coating compound, with a primer or primer coating.

The viscosity of the coating compound according to the invention can be so adjusted by the addition of inert solvents, that a spin coating of planar substrates is made possible. Thus, with the aid of the process according to the invention, it is e.g. possible to provide aluminized polycarbonate disks (CDs) in a dip-spin coating process with a condensate-stable, highly adhesive and scratch/abrasion-proof coating.

The coating compound applied is optionally dried and subsequently hardened. If hardening takes place by UV radiation, in a non-limitative manner it can e.g. be performed for between 10 and 20 seconds at 2400 Watt, but other radiation quantities and/or times are also possible. If e.g. aluminized polycarbonate disks (CD's) are provided with the inventive coating, a UV radiation of 5 seconds at 4000 Watt has proved successful.

If hardening takes place thermally, in non-limitative manner this can take place e.g. in that the coating is kept for between 15 and 60 minutes at 130° C. As a function of the thermal resistance of the substrate and the inventive coating, other temperatures and pot lifes are possible.

In the case of a combined UV/IR or IR/UV hardening, in non-limitative manner the substrate can initially be exposed for e.g. 10 seconds to UV radiation of 2400 Watt and then kept for 30 minutes at 130° C., or it can be initially kept for 90 minutes at 80° C. and then exposed for 20 seconds to UV radiation of 1000 Watt. Other temperatures, pot lifes and radiation energies are also possible. If e.g. aluminized polycarbonate disks (CD's) are provided with the inventive coating, a UV radiation of 10 seconds at 2400 Watt and a subsequent thermal hardening for 30 minutes at 70° C. have proved successful.

The short UV contact times make it possible to integrate the inventive coating compounds into existing production processes without any difficulties being encountered (in-line production). In exenplified manner reference is made to the painting of data carriers made from polycarbonate (compact disks), magnetooptical data stores (MOs), video disks, etc.

Suitable intermediates (=component A) for producing the coating compounds according to the invention consist of a solution of a complexed, metal organic compound with polymerizable ligands and can e.g. be obtained in that a metal organic compound of general formula (I)

$$MR_4 \quad (I)$$

is reacted with one or more singly or multiply ethylenically unsaturated chelating agents having at least two oxygen donor atoms and which are added in a quantity of 0.5 to 10 mole, preferably 1 to 2.5 mole, based on 1 mole of $MR_4$ as the complexing agent.

The radicals R in general formula (I) can be the sane or different, M stands for titanium or zirconium and R stands for halogen, CH or OR'. The halogen can be chlorine or bromine and R' stands for alkyl, alkenyl, alkinyl or acyl, with in each case 1 to 18 and preferably 1 to 4 C-atoms.

In preferred embodiments of the intermediates according to the invention use is made of chelating agents in the form of polymerizable β-diketones, carboxylic acids, glycols or a mixture thereof. In particularly preferred embodiments acrylic or methacrylic acid is used as the chelating agent.

Suitable metal organic compounds $MR_4$ and suitable chelating agents, as well as the production of the inventive intermediates have already been described in detail in conjunction with the inventive coating compounds.

The reaction of the metal organic compound $MR_4$ can be carried out with and without solvents. An additional addition of an inert solvent is not necessary in most cases, because the metal organic compounds $MR_4$ are generally commercially available as alcoholic solutions, so that after reaction with the polymerizable chelating agent an alcoholic solution of the complexed, metal organic compound $MR_4$ is available. The addition of an inert solvent is only necessary if the viscosity of the inventive intermediate is too high.

The inventive solution of the complexed, metal organic compound $MR_4$ is stable in storage, provided that UV radiation, heat and water are excluded.

Further embodiments of the inventive intermediates contain as the paint additive per mole of compound (I) up to 2.5 and preferably 1.0 to 0.05 mole of a polyfunctional acrylate and/or methacrylate having up to 5 acrylate and/or methacrylate groups. Suitable polyfunctional acrylates and methacrylates have already been described in detail in connection with the inventive coating compounds. Preferred polyfunctional acrylates are 1,1,1-tris(hydroxymethyl)-propane triacrylate, di-trimethylol)-propane tetra-acrylate, di(pentaerythritol)-pentaacrylate or pentaerythritol-triacrylate.

Suitable intermediates (=component B) for producing the coating compounds according to the invention comprise a hydrolyzate of one or more radically polymerizable alkoxy silanes. Said hydrolyzate can e.g. be obtained in that one or more radically polymerizable alkoxy silanes of general formula (II) are hydrolyzed, hydrolysis being carried out, optionally in an inert solvent, with a smaller quantity, but at least half the water quantity necessary for the complete hydrolysis of all the alkoxy groups:

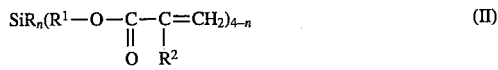

In general formula (II) n has the values 2 or 3 and the radicals R, $R^1$ and $R^2$ are in each case the same or different, R has the same meaning as in formula (I) , $R^1$ is an alkenyl radical with 1 to 8 C-atoms and $R^2$ is a H-atom or a hydrocarbon radical, preferably an alkyl radical with 1 to 8 C-atoms.

Suitable polymerizable alkoxy silanes and the production of the inventive intermediates have already been described in conjunction with the coating compounds according to the invention. In preferred embodiments the polymerizable alkoxy silane is a 3-methacryloxypropyl-trialkoxy silane or a 3-acryloxypropyl-trialkoxy silane.

The hydrolysis of the polymerizable alkoxy silanes can be carried out with or without solvents, water being looked upon as a reactant and not a solvent. The addition of an inert solvent is not absolutely necessary, because during the hydrolysis of the alkoxy silanes R'OH is given off and fulfils the function of a solvent in the reaction medium. The addition of a solvent is only necessary if the viscosity of the inventive intermediates is too high.

Further embodiments of the intermediates according to the invention contain as the paint additive and per mole of compound II up to 0.5 and preferably 0.2 to 0.01 mole of a polyfunctional acrylate and/or methacrylate having up to five acrylate and/or methacrylate groups. Suitable polyfunctional acrylates and methacrylates have been described in conjunction with the coating compounds according to the invention. Preferred polyfunctional acrylates are 1,1,1-tris(hydroxymethyl) -propane triacrylate, di(trimethylol) propane tetraacrylate, di(pentaerythritol)-pentaacrylate or pentaerythritoltriacrylate.

The inventive hydrolyzate of the polymerizable alkoxy silane is stable when stored in the absence of UV radiation and heat.

The coating compounds according to the invention are described in greater detail hereinafter relative to embodiments.

Different substrates are coated with differently composed, inventive coating compounds, which are thermally hardened by UV radiation and/or combined IR/UV radiation and whose hardness, abrasion resistance, adhesion and stability are evaluated after storing under humid conditions.

UV Hardening

UV hardening was carried out in a continuous UV apparatus supplied by Beltron (type 22/III). The radiator capacity is up to 4000 W (400 Watt/cm) and the tape speed variable between 0.2 and 36.0 m/min.

Determining the Abrasion Resistance (DIN 52347)

This wear test according to the friction wheel method is used for determining the behavior of glass and transparent plastic with respect to sliding wear, the test being carried out on flat surfaces. The measured quantity is the increase of stray light. Positioned horizontally on the rotating table of the wear testing apparatus, the testpiece is subjected to sliding wear by two friction wheels rotating in opposition directions (100 cycles). The friction wheels are made from a specific, fine-grained abrasive agent ($Al_2O_3$), which is embedded in rubber. The measured quantity for the wear is the increase in the scattering of the transmitted light resulting from the surface change during the wear test. It is to be measured as a degree of the diffuse transmission ($T_d$) or turbidity $T_d$.

Determination of the Abrasion Resistance using the Frank Abrasion Testing Machine Karl Frank GmbH, Weinheim-Birkenau, friction wheel type CS10F, loading 2.5N, 50 revolution (U) at 60 r.p.m.

Evaluating the Adhesion to the Substrate

The adhesion of the coating to the substrate was tested by three different methods.

a) Tesa film abrasion test for checking the marginal adhesion

A strip of a commercially available Tesa film (Tesafix 6996) is applied to the edge of the substrate at an undamaged point of the paint film, is pressed down in air bubble-free manner and then jerked off under an angle of 90°. Both the Tesa strip and the thus treated paint surface are tested for existing or removed coating material. The test can be repeated a random number of times (up to 20 times) using a new Tesa film at the sane coated substrate point.

b) Grating Cut Test (DIN 53151)

The grating or grid cut test is a simple empirical test for evaluating the ahesion of paints to the substrate. It is also possible to evaluate the brittleness and other strength characteristics of the paint. Using a multiblade apparatus a cut pattern extending through to the substrate with six cuts is made, so as to give a grating or grid with 25 squares. By microscopic examination of the latter and their comparison with reference images grating cut ratings of Gt 0 (very good adhesion) to Gt 5 (very poor adhesion ) are obtained.

c) Tape Test (ASTM D 3359)

This test corresponds to DIN 53151. Prior to the evaluation of the cut pattern, a strip of a commercially available Tesa film is applied to the cutting point and rapidly drawn off under an angle of 90°. The subsequent evaluation takes place in accordance with the above principle.

Condensate Test ( DIN 500 17)

The coated testpiece is stored for 14 days in a heating cubicle at 40° C. and under high atmospheric humidity. The adhesion is then evaluated and the abrasive hardness determined. If the values obtained are in the sane range (the grating cut rating must only decrease by at the most one unit), the test has been successfully completed.

The following abbreviations are subsequently used:

AIBN: azoisobutyronitrile
DBP: dibenzoyl peroxide
IR 184: 1-hydroxycyclohexyl-phenyl ketone
MAS: methacrylic acid
MEMO: 3-methacryloxypropyl trimethoxy silane
PC: polycarbonate
RMMA: polymethyl methacrylate
Sart. 355: Sartomer 355 (ditrimethylol propane tetraacrylate) of Craynor
Sart. 399: Sartomer 399 (dipentaerythritol pentaacrylate) of Craynor
TBPEH: t-butyl-per-2-ethyl hexanoate
TMPTA: 1,1,1-tris (hydroxymethyl) propane triacrylate.

The paint systems used hereinafter are based on MEMO and zirconium methacrylate and are prepared in the following way.

1 mole of MEMO is mixed at ambient temperature with up to 2 mole of water (based on the MEMO). The hydrolyzate is stable in storage. Following the hydrolysis of the MSMO (approximately 24 hours) the complexed zirconium component is added (up to 0.3 mole, based on MEMO). It is possible at this point to add further water quantities (up to 2 mole per zirconium component).

The complexed zirconium component is obtained by reaction of $Zr(OPr)_4$ with distilled methacrylic acid (up to 2 mole, based on the $Zr(OPr)_4$). The methacrylic acid-complexed zirconium compound is stable in storage and can be added in both solution and in solid form.

If desired, it is possible to add a functional (meth)acrylate with up to 1 to 5 (meth)acrylate groups. The functional (meth)acrylate can also be added to the MEMO hydrolyzate and this solution is also stable in storage.

The MEMO hydrolyzate, the complexed zirconium compound and the starter for the polymerization are mixed, applied to the substrate and hardened. The coating is then investigated in accordance with the previously described processes. The results are given in the following tables.

TABLE 1

| | Paints used | | | |
|---|---|---|---|---|
| Paint | I | II | III | IV |
| Paint type | 10 MEMO | 10 MEMO | 10 MEMO | 10 MEMO |
| | 1 Zr(MAS) | 2 Zr(MAS) | 2 Zr(MAS) | 2 Zr(MAS)$_2$ |
| Starter | 1% IR 184 | 1 AIBN | 1% TBPEH | 1% IR 184 |

Paints I to IV are neither provided with additives, nor thinned with solvents. Paints I to IV are applied to printed circuit boards using the dipping process.

TABLE 2

| | Hardening and characteristics of paints I to IV | | | |
|---|---|---|---|---|
| Paint | I | II | III | IV |
| Hardening | 10 s UV 2400 W | 45 min 130° C. | 60 min 130° C. | 10 s UV 2400 W + 30 min 130° C. |
| Coating thickness | 10 μm | 7 μm | 7 μm | 12 μm |
| Stray light loss (in % turbidity) | 2.0 | 2.7 | 2.1 | 1.6 |
| Grating cut | Gt 0 | Gt 0–1 | Gt 0–1 | Gt 0 |
| Tape test | Gt 0 | Gt 0–1 | Gt 0–1 | Gt 0 |
| Condensate test | stable | stable | stable | stable |

All the paint variants given in table 1 lead to a condensate-stable protective coating adhering well to polycarbonate. The selected paint variants can be hardened beth thermally (examples II, III) commonly by UV radiation (example I) or by combined UV/IR radiation (example IV).

TABLE 3

| Paint | Paints used | |
|---|---|---|
| | V | VI |
| Paint type | 10 MEMO | 10 MEMO |
| | 2 Zr(MAS)$_2$ | 2 Zr(MAS)$_2$ |
| Starter | 1% DBP | 1% DBP |

Paints V and VI are neither provided with additives, nor thinned with solvents. The paints V and VI are applied to PMMA disks using the dipping process.

TABLE 4

| Hardening and characteristics of paints V and VI | | |
|---|---|---|
| Paint | V | VI |
| Hardening | 90 min 80° C. + | 90 min 80° C. + |
| | 20 s UV/1000 W | 20 s UV/1000 W |
| Stray light loss | 1.7 | 1.9 |
| (in % turbidity) | | |
| Grating cut | Gt 0 | Gt 0 |
| Tape test | Gt 0 | Gt 0 |
| Condensate test | stable | stable |

Even on polycarbonate, coating with paint VI leads to good abrasion resistance characteristics (2.3% light scattering in the Taber abraser test) after thermal curing. However, the sane abrasion resistance is also obtained if the coated printed circuit board is thermally prehardened (30 min, 130° C.) and subsequently hardened with UV radiation (1000 W60 sec). Independently of the hardening, the coating is condensate-stable.

Even on acrylic-butadiene-styrene substrates, the coating with paint VI leads to abrasion-proof and condensate-stable coatings in the case of combined thermal (90 min, 70° C.) and UV hardening (2×2000 W).

TABLE 5

| Characteristics of paint I on aluminized PC disks (CDs) — hardening: 10 sec UV/2000 W, 30 min, 70° C. | | |
|---|---|---|
| Substrate | PC side | aluminized side |
| Coating thickness | 22/2 μm | 22/2 μm |
| Stray light loss | 1.8 | 1.2 |
| Grating cut | Gt 0 | Gt 1 |
| Tape test | Gt 1 | Gt 3 |
| Condensate test | stable | stable |

TABLE 6

| Characteristics of paint IV on aluminized PC disks (CDs) — hardening: 10 sec UV/2400 W + 30 min, 70° C. | | |
|---|---|---|
| Substrate | PC side | aluminized side |
| Coating thickness | 13 um | 13 um |
| Stray light loss | 1.5 | 1.2 |
| Grating cut | Gt 0 | Gt 1 |
| Tape test | Gt 0 | Gt 2 |
| Condensate test | stable | stable |

The CD's were coated in a dip-spinning process with paint I (table 5) and paint IV (table 6). Although paint IV with a higher proportion of zirconium methacrylate revealed better characteristics on the tested CD's, the results obtained for paint I are also very good.

Subsequently paint formulations will be described, which can be cured by UV radiation only and lead to good scratch-proof coatings, e.g. on CD's. On the basis of paint ccmposition IV further paint variants were produced by introducing acrylates.

TABLE 7

| Paint | Paints used | | |
|---|---|---|---|
| | VII | VIII | IX |
| Paint type | 10 MEMO | 10 MEMO | 10 MEMO |
| | 2 Zr(MAS)$_2$ | 2 Zr(MAS)$_2$ | 2 Zr(MAS)$_2$ |
| | 2 Sart. 355 | 1 Sart. 399 | — |
| Starter | 2% IR 184 | 2% IR 184 | 2% IR 184 |

The paints are neither thinned with solvents, nor provided with additives. The untreated CD's (aluminized PC disks) are coated by a dip-spinning process.

TABLE 8

| Characteristics of paint VII to IX on aluminized PC disks (CD's) PC-side: hardening 5 s UV/4000 W | | | |
|---|---|---|---|
| Paint | VII | VIII | IX |
| Grating cut | Gt 0 | Gt 0–1 | Gt 1–3 |
| Tape test | Gt 1 | Gt 1 | — |
| Marginal adhesion | O.K.(20x) | O.K.(20x) | fluctuating |
| Condensate test | stable | stable | stable |
| Pulling-off force | 2N | — | — |
| Solvent stability | | | |
| 1) ethanol | O.K. | — | O.K. |
| 2) acetone | O.K. | — | O.K. |
| Abrasion test | Note 9 | — | Note 9 |

In the abrasion test on the Frank machine unprotected polycarbonate was rated 1 in a scale of 1 to 10, whereas commercially available UV paints had values between 5 and 7.

Through the use of polyfunctional acrylates in the MEMO/zirconium/methacrylic acid hydrolyzate, the adhesive strength of the coating also increased on the metallized side of the CD. Good marginal adhesion was also observed on the aluminized side with paint variants VII and VIII, whereas for paint variant IX the coating on the aluminized side separated after the first tearing off of the Tesa film.

The solvent stability and abrasion resistance of paint variants VII and IX exist on both the metallized and the PC side. The coating thickness of paint VII reached the following values: 5.34 μm on the inside and 5.12 μm on the outer edge of the CD.

What is claimed is:

1. Process for producing UV or UV/IR or IR/UV hardened coatings on substrates by the application of a coating compound to the substrate to be coated and by the action of UV radiation, or combined UV/IR or combined IR/UV radiation on the coated substrate, characterized in that a coating compound of a component A, which is a solution of a complexed, metal organic compound with polymerizable ligands and which is obtained by reacting, optionally in an inert solvent, a metal organic compound of general formula (I), $$MR_4 \quad (I)$$

in which the radicals R are the same or different, M=Ti or Zr and R=Hal OHOR' or O-(CH$_2$-CH$_2$O—)$_m$R', with m=1 to 3, Hal=Cl or Br and R'=alkyl, alkenyl, alkynyl or acyl, in each case with 1 to 18 C-atoms, with one or more singly or multiply ethylenically unsaturated chelating agents having at least two oxygen donor atoms and which are used in a quantity of 0.5 to 10 mole, based on 1 mole of $MR_4$, as sequestrants, a component B, which is a hydrolyzate of one or more radically polymerizable alkoxy silanes and which is obtained by the hydrolysis of one or more radically polymerizable alkoxy silanes of general formula (II), $$SiR_n(R^1-O-\underset{\underset{O}{\|}}{C}-\underset{\underset{R^2}{|}}{C}=CH_2)_{4-n} \qquad (II)$$

with n=2 or 3, in which the radicals R, $R^1$ and $R^2$, which are the same or different, R has the same meaning as in formula (I), $R^1$ is an alkylene radical with 1 to 8 C-atoms and $R^2$ is an H-atom or a hydrocarbon radical, preferably an alkyl radical, with 1 to 8 C-atoms, in which the hydrolysis, optionally in an inert solvent, is performed with a smaller, but at least half the water quantity necessary for the complete hydrolysis of all the alkoxy groups, 0.1 to 5% by weight of a component C, which is an initiator for the polymerization, and optionally conventional additives, the molar ratio of the hydrolyzable compound (II) to the complexed compound $MR_4$ being between 10:4 and 10:0.1.

2. Process according to claim 1, characterized in that use is made of a metal organic compound (I) and/or a radically polymerizable alkoxy silane (II), in which R'=alkyl, alkenyl, alkynyl or acyl, with in each case 1 to 6 C-atoms.

3. Process according to claim 1, characterized in that the singly or multiply ethylenically unsaturated chelating agent is used in quantities of 1 to 2.5 mole, based on 1 mole of $MR_4$.

4. Process according to claim 1, characterized in that use is made of a coating compound, whose molar ratio of hydrolyzable compound (II) to complexed compound $MR_4$ is between 10:2.5 and 10:0.5.

5. Process according to claim 1, characterized in that substrates of polycarbonate (PC), polystyrene (PS), polymethyl methacrylate (PMMA), acrylic-butadiene-styrene (ABS), polyvinyl chloride (PVC), polyurethane (PUR), polyethylene (PE), polyethylene terephthalate (PET), metallized plastics or metals are coated.

6. Process according to claim 1, characterized in that use is made of an ethylenically unsaturated compound, in whose component A the compound $MR_4$ was complexed by means of two oxygen atoms of a polymerizable B-diketone, a polymerizable carboxylic acid, a polymerizable glycol, or a mixture thereof.

7. Process according to claim 6, characterized in that use is made of a coating compound, in whose component A the compound $MR_4$ was complexed with an acrylic acid or a methacrylic acid.

8. Process according to claim 1, characterized in that use is made of a coating compound, whose component A is an alcoholic solution of the complexed compound $MR_4$.

9. Process according to claim 1, characterized in that use is made of a coating compound, whose component B contains a hydrolyzate of one or more 3-methacryloxypropyl trialkoxy silanes and/or one or more 3-acryloxypropyl trialkoxy silanes.

10. Process according to claim 1, characterized in that use is made of a coating compound, whose component A, per mole of compound (I), contains 0.5 to 2.5 mole of a polyfunctional acrylate and/or methacrylate, which have up to five acrylate and/or methacrylate groups.

11. Process according to claim 1, characterized in that use is made of a coating compound, whose component B, per mole of compound (II), contains about 1 mole of a polyfunctional acrylate and/or methacrylate, which have up to five acrylate and/or methacrylate groups.

12. Process according to claim 10, characterized in that use is made of a coating compound, which contains 1,1,1-tris(hydroxymethyl)-propane triacrylate, di-(trimethylol)-propane tetraacrylate, di(pentaerythritol)pentaacrylate or pentaerythritol triacrylate.

13. Substrates provided with a coating hardener by UV or UV/IR or IR/UV obtainable according to a preparation process of claim 1.

14. A process for producing a hardenable coating compound on a substrate, the method consisting essentially of mixing and polymerizing a compound consisting essentially of a component A, which is a solution of a complexed, metal organic compound with polymerizable ligands and obtained by reacting, optionally in an inert solvent, a metal organic compound of general formula (I)

$$MR_4 \qquad (I)$$

in which the radicals R, which are the same or different, M=Ti or ZR and R=Hal, OH, OR' or $O-(CH_2CH_2O-)_mR'$, with m=1 to 3, Hal=Cl or Br and R'=alkyl, alkenyl, alkynyl, or acyl, in each case with 1 to 18 C-atoms, with one or more singly or multiply ethylenically unsaturated chelating agents having at least two oxygen donor atoms and used in a quantity of 0.5 to 10 mole, based on 1 mole or $MR_4$, as sequestrants, a component B, which is a hydrolyzate of one or more radically polymerizable alkoxy silanes and obtained by hydrolysis of one or more radically polymerizable alkoxy silanes of general formula (II)

$$SiR_n(R^1-O-\underset{\underset{O}{\|}}{C}-\underset{\underset{R^2}{|}}{C}=CH_2)_{4-n} \qquad (II)$$

with n=2 or 3, in which the radicals R, $R^1$ and $R^2$, which are in each case the same or different, R has the same meaning as in formula (I), $R^1$ is an alkylene radical with 1 to 8 C-atoms and $R^2$ is a H-atom or a hydrocarbon radical, preferably an alkyl radical, with 1 to 8 C-atoms, in which the hydrolysis is performed with a smaller, but at least half the water quantity necessary for the complete hydrolysis of all the alkoxy groups, and 0.1 to 5% by weight of a component C, which is an initiator for the polymerization, the molar ratio of the hydrolyzable compound (II) to the complexed compound $MR_4$ in the coating compound being between about 10:4 and 10:0.1.

15. A process as defined in claim 14 in which the component C is aryl ketone.

16. A process as defined in claim 14 in which the component C is benzophenone.

17. A process as defined in claim 14 in which the component C is 1-hydroxycyclohexyl-phenyl ketone.

18. A process as defined in claim 14 in which the component C is an organic peroxide.

19. A process as defined in claim 14 in which the component C is dibenzoyl peroxide.

20. A process as defined in claim 14 in which the component C is azoisobutyronitrile.

* * * * *